Oct. 25, 1938.     H. G. FLOYD ET AL     2,134,117
PLANT FOR AND METHOD OF MANUFACTURING METAL CASTINGS
Filed Dec. 2, 1936      2 Sheets-Sheet 1
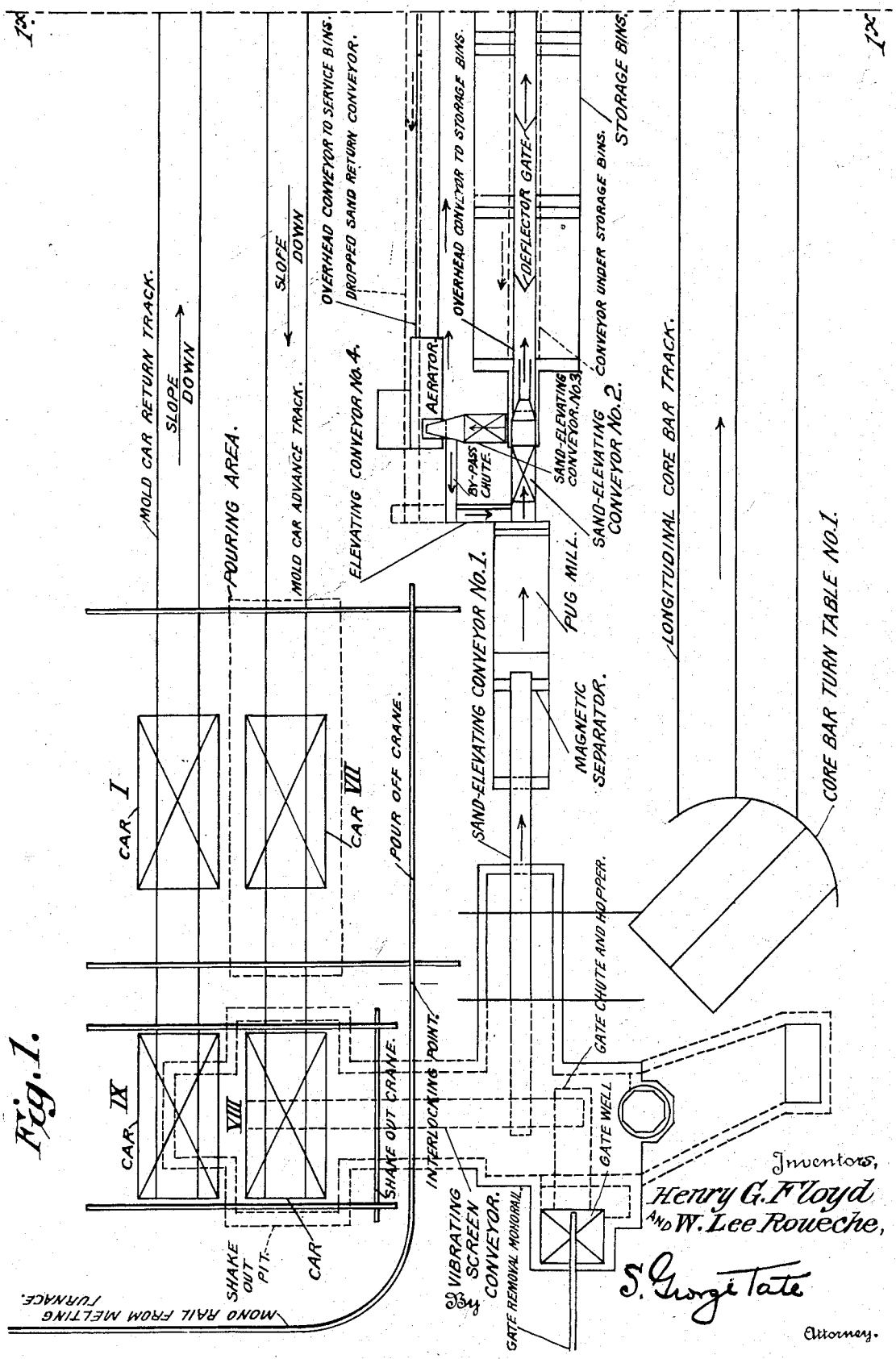

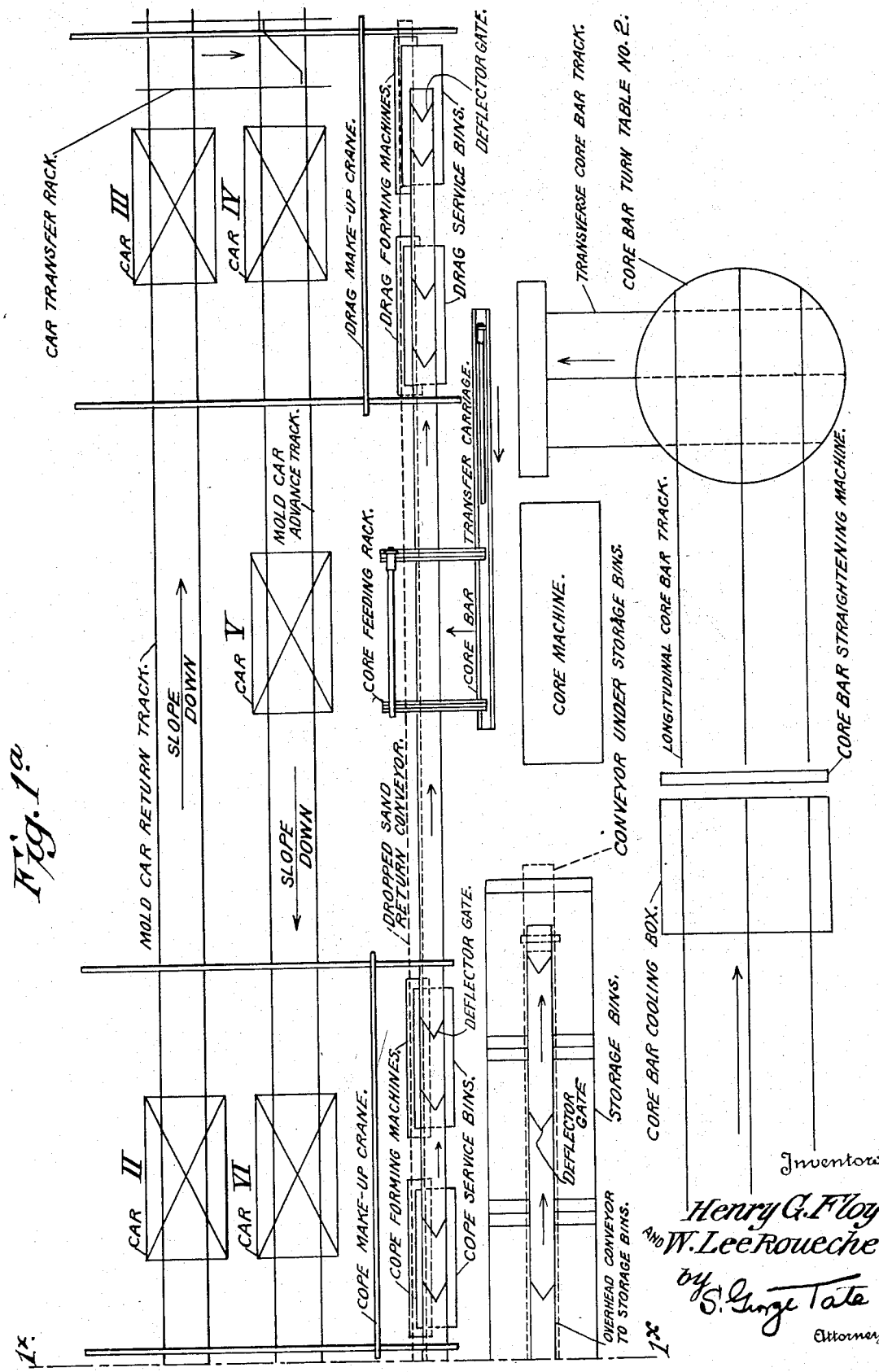

Patented Oct. 25, 1938

2,134,117

UNITED STATES PATENT OFFICE

2,134,117

PLANT FOR AND METHOD OF MANUFACTURING METAL CASTINGS

Henry G. Floyd and William Lee Roueche, Birmingham, Ala., assignors to McWane Cast Iron Pipe Co., Birmingham, Ala.

Application December 2, 1936, Serial No. 113,911

5 Claims. (Cl. 22—20)

This invention relates to plants for and methods of manufacturing metal castings. Although the invention relates more especially to plants for and methods of manufacturing iron pipes cast horizontally, it is not necessarily limited in its application to the production of such castings.

Many varieties of metal castings—for example, cast iron pipes—are produced in large numbers of standard sizes. This requires the use of rather expensive sand-handling, mold-forming and -handling, and hot-metal-handling equipment. Because of the high cost of such equipment it is necessary to arrange and operate it in such a way as to obtain by its use the maximum production possible within limits determined by practical considerations. Thus the equipment should be arranged with due regard to the amount of floor space it occupies. Equipment arranged for optimum operating capacity and efficiency might necessitate an uneconomical use of floor space. These two considerations, namely, arrangement of equipment for operating capacity and efficiency and economical utilization of floor space, therefore must be balanced with each other.

There also must be considered the flexibility of the system for operation under conditions which may be varied voluntarily or which may change because of an accidental temporary slowing up or a shutting down of one part of the equipment. The plant lay-out—i. e., the relative arrangement of the various equipment units—therefore should be such that the several operations will best be coordinated and synchronized so as to provide for efficiency and large production, but at the same time the equipment units for performing successive operations should not be coupled so closely that a slight temporary delay in the operation of one unit will retard operation of the entire system.

A further and quite general consideration is that there must be a proper balance between the cost of equipment units and the cost of operation thereof, including power cost and maintenance cost.

An object of the present invention is to provide a plant for and method of manufacturing metal castings in which the several factors referred to above are so balanced that, giving due consideration to the proper weight of each, castings may be produced at a minimum final cost and in large numbers.

A further object is to provide a plant for the continuous production of metal castings in which the flow of molds, flasks, sand, and other material is mainly in two parallel directions whereby the plant will occupy an area relatively narrow as compared to its length.

A further object is to provide a plant and a method of the general character referred to in which molds travel in one direction substantially in a straight line and in which empty flasks travel in a parallel opposite direction, the travel of cope flasks in each direction being less than the travel of the drag flasks.

A further object is to provide a plant and method of the general character referred to and in which sand is conditioned and handled or transported in a novel manner with respect to the molding, pouring, and shake-out equipment.

A still further object is to provide an improved arrangement of equipment for and method of conditioning and handling or transporting molding sand.

Other objects will become apparent from a reading of the following detailed description, the accompanying drawings, and the appended claims, the invention defined in each of which constitutes the attainment of at least one object of the invention.

In the drawings,

Figure 1 is a diagrammatic plan view of a part of a plant embodying the invention; and Figure 1a is a view similar to Figure 1 but showing the part of the plant not shown in Figure 1.

Figures 1 and 1a are intended to be read together as a single figure joined along the lines $1^x$—$1^x$ of each of said Figures 1 and 1a.

Those skilled in the art of founding are familiar with the essential basic operations performed in the production of metal castings; but in order that the basic operations may more easily be kept in mind during reading of the detailed description and claims they are set forth briefly below:

1. Fill drag flask with sand and ram;
2. Make core and place in drag;
3. Fill cope flask with sand and ram;
4. Complete mold by placing cope on drag;
5. Pour molten metal in mold;
6. Remove cope and shake out sand;
7. Remove castings and core bars from drag;
8. Shake out sand from drag;
9. Break gates from pipe and remove core bars;
10. Return flasks and core bars to respective make-up stations;
11. Remove gates and scrap from sand, recondition, and return to sand storage bins.

A plant for performing these basic operations is shown in Figures 1 and 1a considered together, the various parts being designated by legends applied directly to the drawings. Reading from the right-hand end of Figure 1a to the left, the mold-forming, core-supplying, pouring, and shake-out means are positioned in a substantially or generally straight line.

At the right-hand end of Figure 1a, there is shown a pair of drag-forming machines which are positioned under overhead drag service bins. The drag-forming machines may be of any desired type, are adapted to receive empty flasks from flask-transporting means to be described later, and are adapted to receive sand directly from the overhead service bins, the service bins being kept full of sand in a manner also to be set forth later. To the left of the drag-forming machines and substantially in line therewith is a core-feeding rack on which is kept a supply of cores to be set in the drags after the drags have been completed and moved to the left to the vicinity of the feeding rack. Further on to the left of the core-feeding rack is a pair of cope-forming machines which are positioned respectively under cope service bins. Empty cope flasks are supplied to the cope-forming machines, and sand is supplied to the cope service bins as will be described later. The copes are formed or "rammed up" by the cope machines, and then placed on the cored drags after the latter have been moved to the left from the drag machines and the core-feeding rack. The mold thus closed or completed by the positioning of the cope on the drag is moved further to the left to the pouring area indicated in dotted lines in Figure 1. After the molds have been poured or filled with molten metal, they are moved further to the left until they are over a shake-out pit shown at the extreme left in Figure 1. It will be observed that the operations of making the drag molds, setting the cores, making the cope molds and closing them upon the cored drags, pouring the molds, and shaking them out proceeds along a substantially straight line reading from right to left as viewed in the drawings, the equipment for performing these operations being positioned substantially in a straight line.

In order that the equipment described so far may be operated substantially continuously, means are provided for moving the molds and mold parts—i. e., copes and drags—along the line referred to above, and for then returning the empty cope flasks from the shake-out pit to the cope machines and for returning the empty drag flasks from the shake-out pit to the drag machines. In the plant shown, this transportation of the mold parts and flasks is accomplished by means of a novel arrangement of cars and tracks. A mold car advance track or track-way is positioned to extend in a substantially straight line in front of the cope and drag machines and the core-feeding rack so as to permit movement of transfer cars from right to left as viewed in the drawings. Preferably, in accordance with the invention, the mold car advance track slopes down from right to left so as to facilitate movement of the cars in that direction. This arrangement permits the cars to be pushed manually with a minimum effort, and dispenses with the necessity for a positive mechanical car drive, thereby eliminating expensive drive equipment and increasing the flexibility of the plant. The mold car advance track provides for the movement of cars directly in front of the drag and cope machines so as to transport the mold parts and then the completed molds in a straight line to the pouring area, and thence to the shake-out area.

In order to return the empty drag and cope flasks respectively to the drag-forming and cope-forming machines, there is provided a mold car return track or track-way which is parallel to the mold car advance track and which is located on the side of the mold car advance track opposite the side thereof on which the cope and drag machines and the core-feeding rack are located. Cars bearing empty cope and drag-flasks travel from left to right on the return track, and, in order to facilitate manual movement of the cars, this track is arranged to slope down gradually from left to right. In order to save space, the advance track and the return track are positioned closely together, so closely together, in fact, as to prohibit their being connected by means of car-negotiable curved portions. In order that there may be maintained a continuous flow of cars and mold and flask parts from right to left on the advance track and from left to right on the return track, a car-transfer device is located at the right-hand end of the two tracks. This car transfer may be of any desired construction such as a transfer rack working on rollers set on the floor operated by means of a hydraulic cylinder. Since the transfer device does not per se constitute the present invention, it is illustrated only diagrammatically. If desired, the transfer device may be dispensed with and the cars may be transferred from the return track to the advance track by means of the overhead drag make-up crane. Cars and flask parts are transferred from the advance track to the return tracks at the left-hand ends thereof by means of a shake-out crane.

In order to obtain smooth flow of flask parts to the cope and drag machines, there are provided a drag make-up crane which bridges the two tracks and the drag machines, and a cope make-up crane which bridges the two tracks and the cope machines, both cranes of course operating transversely of the tracks as shown in Figure 1ª. Molten metal from the cupola or other melting furnace is brought into the plan by means of a mono-rail adapted to register at an interlocking point with the bridge on a pour-off crane positioned to span the pouring area, the arrangement being such that, after the mono-rail carriage and molten metal and ladle have been run from the mono-rail onto the bridge of the pour-off crane located in the position shown in Figure 1, the bridge is moved transversely to a position over the pouring area.

During continuous operation of the plant, a plurality of cars is employed. The drawings show only a sufficient number (nine) of cars to illustrate and support a description of the plant and its method of operation. It will be understood, however, that additional cars preferably should be employed, such additional cars being interspersed between the cars shown in the drawings. The use of these additional cars permits greater flexibility of operation, since it dispenses with the necessity of slowing down the whole plant when one equipment unit is shut down temporarily. The nine cars shown are in the positions listed below, reference being had to the position numbers marked on the drawings.

| Car position number | Functional position |
|---|---|
| I | Car carrying empty drag flask and cope flask on top. |
| II | Car carrying empty drag flask and cope flask on top in position in front of cope machine and under cope make-up crane. |
| III | Car carrying empty drag flask. |
| IV | Car carrying rammed-up drag. |
| V | Car carrying cored drag. |
| VI | Car carrying completed closed mold-cope on cored drag. |
| VII | Car carrying mold in pouring position. |
| VIII | Car carrying mold in shake-out position. |
| IX | Car carrying empty drag flask. |

The method of producing castings and the operation of the plant as described so far is as follows. Beginning at car position I, the car carrying the empty drag flask and the empty cope flask on top thereof is moved to the right on the return track until it is in car position II underneath the cope make-up crane. When the car has arrived at this point, the cope make-up crane picks up the empty cope flask and positions it on one of the cope-forming machines, where it is filled with sand, rammed, and the pattern drawn. The car, carrying the empty drag flask only, is then moved to the right on the return track until it reaches car position III. The drag make-up crane then picks up the empty drag flask and moves it across the tracks to one of the drag machines, where it is filled with sand from the overhead service bin and is rammed and the pattern drawn. The completed drag is then lifted by the drag make-up crane and deposited upon the car, which, in the meantime, has been moved to position IV on the advance track by means of the car transfer rack. The car, with the completed drag thereon, is then pushed to the left to position V in front of the core-feeding rack, and the core or cores are removed from the rack and set in the drag. Then the car is moved to position VI in front of the cope machines, and a completed scope is removed from a cope machine by means of the cope make-up crane and closed upon the drag. The mold thus completed and the car are then moved to the left to the pouring area under the pour-off crane, and the mold is then poured with molten metal. After the mold has been poured, the car and mold are moved to the left until they are over the shake-out pit. The shake-out crane then removes the cope, which is then shaken out, and the empty cope flask is deposited upon an empty drag flask previously positioned on a car in car position IX. This car is then moved to the right on the return track until it reaches car position I bearing an empty drag flask and an empty cope flask thereon. Reverting now to the car in position VIII, which carries at this time only a drag mold and the casing therein, this mold is shaken out, the casting is set aside, the mold shaken out, and the car, together with the empty drag flask is picked up by the empty shake-out crane and moved to position IX. It will be observed that all cars in position IX will bear only an empty drag flask. Thus, as each mold is shaken out, the empty cope flask is deposited upon the empty drag flask previously taken from the preceding car.

The foregoing description of the operation traces the movement of a single car and its cope and drag flasks from position I on the return track under the pour-off crane successively to and from the various equipment units. Considered another way, however, all of the operations are taking place simultaneously; that is, when one car is in position VII, the mold thereon will be poured, while, at the same time, the mold on a car in position VIII will be in the process of being shaken out. Likewise a car in position IV will be receiving a completed drag mold, and a car in position VI will be receiving a completed cope. For the sake of clarity, the description has been based upon the positioning of only one mold on each car. Actually, however, it is possible, and, in fact, desirable that the cars be large enough to carry a plurality of molds; for example, four. The sequence of operations of course will be the same as described above with reference to only one mold on each car, since the operations for a plurality of copes on each car may be performed substantially simultaneously before that car is moved to the next position, the same being true for operations on the drags and the pouring.

It will be observed that the drag molds and empty drag flasks move continuously in one path or circuit, and that the cope molds and empty cope flasks move continuously in a circuit comprising only a portion of the circuit over which the drag molds and empty drag flasks move. This is made possible by the positioning of the cope make-up crane at a point intermediate the ends of the two tracks and by its being adapted to move empty cope flasks from the return track directly across the advance track to the cope machines without its being necessary for the cope flasks to move all the way to the right-hand end of the return track and then back on the advance track to the cope machines. This results in faster operation, greater production, and a saving in floor space.

In accordance with the invention, the equipment for handling and conditioning the sand is positioned in back of the molding equipment (the advance and return tracks being in front of the molding equipment as pointed out above). The sand handling and conditioning equipment is so arranged that the sand travels mainly in a direction parallel to the line along which the various molding, pouring, and shake-out units are positioned. In the form shown, sand removed from the flasks at the shake-out position is carried transversely for a short distance by means of a vibrating screen conveyor which removes gates from the sand and delivers the gates to the gate chute and hopper; and deposits the sand upon elevating conveyor No. 1. Gates thus delivered to the gate chute and hopper pass along to a gate well from which they are removed by means of a gate removal monorail (see Figure 1). Elevating conveyor No. 1 carries the sand upwardly and to the right over a magnetic separator which removes small bits of gates, sprues, fins, and other extraneous metal. The sand is discharged by the elevating conveyor No. 1 into a pug mill which mixes and tempers—i. e., moistens—the sand. The sand discharged by the pug mill is elevated by elevating conveyor No. 2 and is moved to the right by the overhead conveyor which extends above a storage bin arranged in a plurality of sections. Deflector gates positioned on top of the overhead conveyor are adapted to be operated so as to effect discharge of the sand carried by the overhead conveyor into any selected storage bin. Each storage bin is provided with a discharge gate (not shown) in its bottom, each of which gates is adapted to discharge sand onto a conveyor extending longitudinally under the storage bins. This conveyor is operated in a direction to transport sand to the left as viewed in the drawings, discharging the sand upon an elevator conveyor No. 3 which delivers the sand to an aerator. After being conditioned in the aerator, sand is carried to the right by an overhead conveyor leading to the cope and drag service bins. The sand thus carried over the cope and drag service bins is deflected laterally off the conveyor by means of the deflector gates located above the service bins, the sand then falling onto the service bins. Sand dropped or spilled around or in the vicinity of the cope machines and the drag machines is returned to the storage bins by means of an underground spilled sand conveyor shown in dotted lines which moves the sand to the left and delivers it to elevating conveyor No. 4, the latter discharging the sand to elevating conveyor No. 2, from whence the sand is carried back to the storage bin. In order that the sand may be maintained in suitable condition during a shut-down of a plant, a by-pass or sand chute is disposed between elevating conveyor No. 3 and elevating conveyor No. 4 for receiving sand which is on its way to the service bin and for returning it to the storage bins. The by-pass chute may be rendered operative or inoperative at will so as to either by-pass the sand or to permit it to continue on its way to the service bins, whichever is desired. This makes it possible to extract sand from underneath one of the storage bins and transfer it to a selected other storage bin, the path of travel for such inter-change being on the conveyor under the storage bins, the elevating conveyor No. 3, the by-pass chute, the elevating conveyor No. 4, the elevating conveyor No. 2, and the overhead conveyor over the storage bins. Sand being elevated by the conveyor No. 3 may be diverted to the by-pass chute by a suitable deflector device, the construction of which per se does not constitute the present invention. Deflector devices for diverting sand from travelling conveyors are well known, one form being shown at 241 in Figures 1ᵇ, 3 and 7 of the patent to Douglas, 1,941,434, of December 26, 1933.

In the manufacture of cast iron pipe by the horizontal method—i. e., with the pipes molded and cast with the axes horizontal—it is usual to employ metal core bars or arbors which are used repeatedly, it being necessary, of course, to face each core bar with sand to form a core suitable for use in the mold. In a plant in accordance with the present invention, core bars removed from the castings at the shake-out pit are placed on a core bar turntable No. 1 and are then rolled along a core bar track extending parallel to the mold car advance and return tracks and positioned behind the sand handling and conditioning equipment. A core bar cooler and a core bar straightening machine are positioned as shown in the path of movement of core bars along the track. A turntable No. 2 is adapted to receive cooled and straightened core bars and to discharge them upon a transverse core bar track from which the cores are moved to a transfer carriage adapted to shift the core bars to a core machine where the core bars are faced with sand to form completed cores which are then placed upon the core-feeding rack.

It is apparent from the foregoing that we have provided a plant for and method of manufacturing metal castings both of which, either as disclosed herein or with modifications within the scope of the invention as defined in the claims, provide for the economical continuous production of castings by means of equipment units which occupy small floor space and which are so disposed as to provide flexibility of operation and assurance against substantial interruption in production due to localized temporary disabling of one part or unit of the equipment.

We claim:

1. In a method for the manufacture of metal castings, continuously moving a plurality of drag flasks and cope flasks from mold-preparing position to mold-pouring position and mold shake-out position and thence moving mold flasks back to mold-forming position, characterized in that each drag flask after being shaken out is placed to receive on top thereof the empty cope flask of the next following mold, and each cope flask after being shaken out is placed on the empty drag flask of the immediately preceding mold.

2. In a method for the manufacture of metal castings, continuously moving a plurality of drag flasks and a plurality of cope flasks less in number than the number of drag flasks from mold-preparing position to mold-pouring position and mold shake out position and thence moving mold flasks back to mold-forming position, characterized in that each drag flask after being shaken out is placed to receive on top thereof the empty cope flask of the next following mold, and each cope flask after being shaken out is placed on the empty drag flask of the immediately preceding mold.

3. In a plant for the manufacture of metal castings, the combination of drag-molding means, core-supplying means, cope-molding means, pouring means, and shake-out means serially disposed substantially in line in the order specified; mold-advance transporting means extending substantially in a straight line in front of said molding means; flask-return transporting means extending substantially parallel to said mold-advance transporting means and on the side thereof opposite said molding means; sand handling means located in back of said molding means for receiving sand at the shake-out means and conveying it to the molding means mainly in a direction parallel to the line of extent of said molding, core-supplying, pouring, and shake-out means, said sand handling means including means for conditioning the sand en route to the molding means; and conveying means for transporting core bars from the shake-out means to a point adjacent said core-supplying means, said conveying means extending substantially parallel to the mold-advance transporting means and being located in back of said molding means.

4. Sand handling and conditioning equipment comprising mixing and tempering means; a storage bin; a service bin; means operable in a predetermined path for conveying sand to the mixing and tempering means; thence to the storage bin; and thence to the service bin; and by-pass means for receiving sand on its way from said storage bin and conveying it back to the storage bin.

5. Sand handling and conditioning equipment comprising mixing and tempering means; a storage bin; a service bin; means operable in a predetermined path for conveying sand to the mixing and tempering means; thence to the storage bin; and thence to the service bin, said means including a conveyor for delivering to said storage bin and a conveyor for delivering from said storage bin to said service bin; and by-pass means extending between said two conveyors and adapted to receive sand from the second-named conveyor and to deliver the sand to said first-named conveyor for return to the storage bin.

HENRY G. FLOYD.
WILLIAM LEE ROUECHE.